UNITED STATES PATENT OFFICE 2,120,236

LACQUER

Walter Durgin Bowlby, Jersey City, N. J., assignor to Egyptian Lacquer Manufacturing Company, a corporation of New Jersey No Drawing. Application April 7, 1936, Serial No. 73,185

1 Claim. (Cl. 134—79)

This invention relates to lacquers and contemplates a novel lacquer of superior properties in which the principal base, or principal film-forming constituent, in nitrostarch.

In the heretofore customary art of lacquer manufacture, nitrostarch has not been employed as the principal base or principal film-forming constituent because it tends to produce brittle and weak films. There have been proposals to employ nitrostarch in a lacquer in which nitrocellulose is the principal film-forming constituent, using soap or other dispersing agent to provide compatability between the nitrocellulose and the nitrostarch and prevent the two nitrated carbohydrates from separating into two separate liquid layers.

Such lacquers have met with little success because the dispersing agent usually produces undesired properties in the dried lacquer film, such as the tendency to "bloom" and a low resistance to the attack of the atmosphere.

Nitrostarch, in general, has a very low viscosity characteristic, that is to say, a large quantity of it may be dissolved in a given solvent without producing a solution of high viscosity. This characteristic is, of course, desirable in a lacquer base, because it permits economy in the amount of solvent employed without producing a mixture which is too thick to use. Unfortunately, this desirable characteristic of nitrostarch has been of little use heretofore, because of the fact that nitrostarch tends to impart several undesirable characteristics, for example, weakness and brittleness to dry lacquer films into which it has been incorporated.

As a result of my investigations, I have discovered that the undesirable properties of nitrostarch in lacquer manufacture may be substantially overcome without sacrifice of its valuable property of low viscosity characteristic. As a result I have produced an excellent lacquer in which substantially all of the base is nitrostarch. By "base" I mean those derivatives of carbohydrates, such as cellulose acetate, nitrocellulose, etc. which are the major film-forming constituents of lacquers and the like.

I have found that the tendency of nitrostarch to impart brittleness to dry lacquer films may be overcome by incorporating a large proportion of plasticizer or softening agent in the lacquer. At the same time the adherence of the dried lacquer film is increased in this way. For most purposes, for example as coatings for paper, or as enamels for metals, the lacquer of my invention serves admirably.

The amount of plasticizer, for example dibutyl phthalate or triacetin, must be at least one-third of the weight of the nitrostarch present in the lacquer, when it is to be used for coating metal surfaces and the like.

When the lacquer is to be used for producing very thin coatings on flexible sheets such as paper, the proportion of plasticizer to nitrostarch may be as little as one-fifth. In such case the dried lacquer film is about .0003 of an inch in thickness.

If thicker lacquer films are desired the proportion of plasticizer to nitrostarch must be increased, otherwise the film will be brittle and weak. If films of a thickness of about .002 of an inch are to be formed on flexible sheets the ratio of plasticer to nitrostarch is preferably between .42 and .46.

Those familiar with the manufacture of lacquers will appreciate that the proportion of plasticizer which I employ is much greater than the customary ratio of plasticizer to nitrocellulose in the lacquers of the prior art.

Throughout this specification and the appended claims, I use the term "base" to describe those derivatives of carbohydrates, such as nitrocellulose, cellulose acetate, nitrostarch, etc., which are the major film-forming constituents in modern lacquers. By "plasticizers" I mean the well known class of softening agents such as dibutyl phthalate, etc., which tend to reduce the brittleness of lacquer films and which remain in the film, to some extent at least, after the solvent employed has evaporated. I employ the term "solvent" to include those organic liquids such as ketones, alkyl acetates, aromatic hydrocarbons, aliphatic hydrocarbons, etc. in which nitrostarch is soluble, and mixtures of one or more of these compounds with each other or with diluents such as alcohols. The term "film-forming ingredient" is used to include lacquer "bases", plasticizers, resins and the like which have inherent film-forming characteristics and remain in the dried lacquer film after the solvent has evaporated. This term does not include pigments, fillers, and like substances which do not themselves have film-forming characteristics even though they remain behind after the lacquer solvent has evaporated and comprise a portion of the dried film.

The preferred lacquer of my invention contains only one base, nitrostarch, and in any case, nitrostarch is the principal base and the principal film-forming ingredient employed. The addition of other bases, in particular nitrocellulose, tends to cause segregation in the lacquer, even when the viscosity characteristics of the nitrostarch and the other base are substantially identical. Upon standing, a lacquer containing nitrostarch and nitrocellulose (both having viscosity characteristics between 4 and 6 centipoises) separates into two layers unless a dispersing agent (such as an alkali soap) is present. This use of a dispersing agent to provide compatibility between the two bases has been suggested heretofore, but I have found that such dispersing agents tend to segregate out of the dried lacquer film, thus spoiling it. Alkali stearates, for example, tend to cause a bloom on the dry lacquer film, thus rendering it unattractive and less resistant to attack.

The nitrostarch which I prefer to employ in the practice of my invention has a nitrogen content ranging from 11.5% to 12.5% and an average viscosity characteristic ranging from 4 to 6 centipoises. Nitrostarch having a nitrogen content below 11.5% by weight causes excessive brittleness in films into which it is incorporated. On the other hand, nitrostarch having a nitrogen content in excess of 12.5% is more combustible than nitrostarch of the preferred nitrogen content, and also is less readily soluble in most commercial lacquer solvents and solvent mixtures.

By viscosity characteristic, I mean the degree of viscosity which is measured in a standard solvent into which a given proportion of a lacquer base, say nitrostarch, has been dissolved. The figures given for viscosity characteristic have reference to the following well known method:

A solution containing 12% by weight of the lacquer base (say nitrostarch) in a solution consisting of 3 parts butyl acetate and 1 part ethyl alcohol is prepared, and the viscosity of the solution in centipoises at 25° C. is determined, preferably in a viscosimeter of the capillary tube type, or by other standard methods. The resulting determination in centipoises is taken as the average characteristic of the lacquer base undergoing investigation.

When it is realized that the so-called "low viscosity" nitrocellulose commonly employed in the manufacture of automobile lacquers and the like has an average viscosity characteristic in excess of 150 centipoises as measured in the foregoing method, it will be clear that the nitrostarch which I employ in the practice of my invention has an exceedingly low viscosity characteristic. It is in large part due to this low viscosity characteristic that I am able to put into solution up to 60% by weight of nitrostarch without increasing the viscosity of the resulting lacquer to a point which precludes its application by customary methods. This proportion of base in lacquer is more than double that of commercial lacquers which have been employed heretofore and enables me to produce exceptionally thick coats in one application and at the same time permits a tremendous economy in the amount of solvent employed.

My invention will be more thoroughly understood in the light of the following detailed description.

Lacquer is prepared according to any of the suitable conventional methods, but in accordance with one or more of the following rules of formulation.

The lacquer base is preferably nitrostarch alone, and in any case nitrostarch is the principal base.

The nitrostarch base must be soluble and preferably has a nitrogen content ranging from 11.5 to 12.5% and an average viscosity characteristic below 6 centipoises as determined by the method hereinbefore set forth.

In no case should the plasticizer employed be less than 20% by weight of the nitrostarch used.

For paper coating compositions from which the dried films weigh about 5 pounds per 3000 square feet, i. e. with a film thickness of about .0003 inch, the ratio of plasticizer to nitrostarch may be kept between 20% and 42% by weight. Such films are very thin, comparable in thickness to those formerly produced on paper by spirit varnishes. If the ratio of plasticizer to nitrostarch in the lacquer is below 20% the film is too brittle and the coated paper tends to curl.

For paper coating compositions from which the dried films weigh about 40 pounds per 3000 square feet, i. e. with a film approximating .002 inch in thickness, the ratio of plasticizer to nitrostarch should be between 42 and 46%. Films of this thickness tend to crack if the ratio of plasticizer to nitrostarch is below about 42%. If the ratio of plasticizer to nitrostarch is above 46%, films of this thickness are flexible and adherent, but tacky. Even in the preferred range small amounts of one or more "anti-tack" agents such as petroleum jelly, paraffin, stearic acid, or other suitable greasy substance may be employed to advantage. Usually 2 to 3% by weight of the lacquer of an anti-tack agent is sufficient to overcome tackiness.

In metal coating compositions, the ratio of plasticizer to nitrostarch should be at least as one is to three. Otherwise, the resulting film is brittle, relatively non-adherent and tends to check and peel. The ratio of plasticizer to nitrostarch should not exceed about 70% in metal coating compositions made in accordance with my invention. Otherwise, the final film is soft and tacky.

Any suitable plasticizer may be employed, but I prefer to use dibutyl phthalate, triethyl citrate, ethyl phthalyl butyl glycolate, methyl ortho benzoyl benzoate, triphenyl phosphate, tricresyl phosphate, triacetin, or mixtures of one or more of these substances. It should be noted that triacetin, methyl ortho benzoyl benzoate and triphenyl phosphate, which are unsatisfactory plasticizers for nitrocellulose, give excellent results when used with nitrostarch.

The following tabulation shows the optimum proportions of various plasticizers to nitrostarch in the coating compositions of my invention:

|  | Percentage of plasticizer present on the weight of nitrostarch |
|---|---|
| Dibutyl phthalate | 43 |
| Triacetin | 35 |
| Triethyl citrate | 40 |
| Methyl ortho benzoyl benzoate | 80 |
| Glycol sebacate | 70 |

In general, plasticizers which are normally liquid at room temperature, such as dibutyl triacetate and triethyl citrate, should be employed in proportions ranging from 20 to 50% by weight of the nitrostarch present. Semi-solid or gummy plasticizers, such as glycol sebacate, if employed alone without a liquid plasticizer should be present in proportions ranging from 50 to 75% by weight of the nitrostarch present. Plasticizers which are solid at room temperature, such as methyl ortho benzoyl benzoate, if used alone must be employed in proportions ranging from 75 to 85% by weight of the nitrostarch present.

Because of the high proportion of plasticizer to nitrostarch which is required when solid or semi-solid plasticizers alone are used, it is desirable to employ mixtures of solid or semi-solid plasticizers with liquid plasticizers in the practice of my invention. The following shows a desirable range of proportions of plasticizer to nitrostarch when mixtures of liquid and semi-solid or solid plasticizers are employed:

| Plasticizer mixture | Optimum ratio of plasticizer mixture to nitrostarch in the lacquer |
|---|---|
| Liquid plasticizer—2 parts | From 40 plasticizer mixture to 100 nitrostarch |
| Solid or semi-solid plasticizer—5 parts. | To 60 plasticizer mixture to 100 nitrostarch |

For producing thick dried films, the lacquer preferably should contain 40% by weight of nitrostarch. With lacquer containing this proportion of nitrostarch, a film of the aforementioned thickness can be produced in a single application. Irrespective of the thickness of film to be produced, it is desirable, of course, to employ as high a ratio of solids (materials which remain the dry lacquer film) to solvents (vehicles which evaporate) as possible, because this tends to decrease loss of solvent. In general, lacquers of my invention containing 40% and up of nitrostarch, are to be preferred for applying even very thin films.

In accordance with my invention, the dried film which results from a lacquer in which the plasticizer is about 20% of the nitrostarch present will ordinarily be such that the nitrostarch is about 83% of the total film-forming ingredients. On the other hand, a dried film resulting from a lacquer in which the plasticizer is equal to 50% of the weight of the nitrostarch will ordinarily be such that about 50% of the film-forming ingredients is nitrostarch. Accordingly, nitrostarch comprises about 50 to 83% of the film-forming ingredients in the dried adherent flexible lacquer films of my invention.

The nitrostarch lacquers may be applied to paper and the like in the same manner that varnish, etc. customarily are applied. Reverse roll machines, knife coaters, and various kinds of rolls may be used. Spray coating and brush application also produce satisfactory results, but these methods are relatively slow and expensive.

Any kind of paper, cardboard, rubber and similar flexible materials may be employed in the practice of my invention. Thus adherent, tough, durable, flexible, brilliant and thick films may be produced on such materials with the nitrostarch lacquers of my invention. I attribute the apparent strength, toughness, flexibility and durability of these lacquer films on flexible backings to the remarkable adhesion developed between the flexible backing and the lacquer film, whereby the film and the backing are enabled to cooperate and the tensile strength of the backing is, in effect, imparted to the whole mass.

The following formulae illustrate novel lacquers made in accordance with my invention:

Formula 1

Parts by weight
Base.—Nitrostarch, average viscosity characteristic 4-6 centipoises _____ 48
Platicizers.—Triacetin _____ 10
Methyl ortho benzoyl benzoate _ 10
Anti-tack agent.—Paraffin _____ 2
Solvent.—Ethyl acetate _____ 30

Total _____ 100
Percent solids—70

This product is admirably suited for producing thick films on paper and the like. The resulting dried film is transparent and substantially colorless. It is resistant to humidity, very thermoplastic, and does not cause the paper to curl or wrinkle.

Formula 2

Parts by weight
Base.—Nitrostarch, nitrogen content 11.5–12.5%, average viscosity characteristic 4-6 centipoises _____ 20
Plasticizer.—Glycol sebacate _____ 15
Pigment.—Titanium dioxide _____ 20
Solvent.—Methyl ethyl ketone and toluol ___ 45

Total _____ 100
Percent solids—55

This product is also intended for use as a paper coating composition and gives a satisfactory opaque finish.

Formula 3

Parts by weight
Base.—Nitrostarch, nitrogen content 11.5–12.5%, average viscosity characteristic 4-6 centipoises _____ 40
Hardening agent.—Ester gum _____ 5
Plasticizer.—Triethyl citrate _____ 16
Anti-tack agents.—Stearic acid _____ .5
Paraffin _____ 1.0
Solvents _____ 37.5

Total _____ 100
Percent solids—62.5

The product of this formula is a satisfactory coating composition for rubber, regenerated cellulose and the like.

Formula 4

Parts by weight
Base.—Nitrostarch, nitrogen content 11.5–12.5%, average viscosity characteristic 4-6 centipoises _____ 30
Plasticizer.—Soft alkyl resins, e. g. glyceryl phthalate _____ 15
Pigment.—Carbon black _____ 5
Solvents.—Butyl acetate _____ 10
Ethyl acetate _____ 10
Toluol _____ 20
Naphtha _____ 10

Total _____ 100
Percent solids—50

This is an enamel for metal coating. Its virtue lies in the fact that it may be applied to metal without a priming coat. It adheres firmly to metal surfaces, and one heavy coat is sufficient.

The lacquers of my invention may be employed on relatively non-absorptive coatings such as steel, without a priming coat and when so applied yield excellent finishes, thus possessing an outstanding advantage over the common nitrocellulose lacquers. In many cases, the thick film-forming characteristics ("build") of the lacquers of my invention enable one to secure a coating of adequate thickness in a single operation, either by brushing or by spraying, and in any case reduce the number of necessary coats substantially.

My invention, in addition to offering a film that is adhesive, flexible, durable and tough, possesses outstanding advantages in that very thick films may be formed at a single application with the expenditure of a small amount of solvent. Moreover, the nitrostarch coating is substantially unaffected by actinic rays, so that it does not discolor appreciably even after long exposure to strong sunlight. In this respect nitrostarch is superior to nitrocellulose; consequently, where a permanently colorless or transparent film is desired, my invention offers a further advantage.

I claim:

A lacquer which upon drying gives a film that is substantially proof against discoloration by actinic rays and in which substantially all of the carbohydrate derivatives present are nitrostarch having a viscosity characteristic to from 4 to 6 centipoises and a nitrogen content of 11.5% to 12.5%, said lacquer containing a plasticizer mixture consisting of about two parts of plasticizer which is substantially liquid at room temperature to about five parts of plasticizer which is at least semi-solid at room temperature, the total plasticizers present being from 40 to 60% by weight of the nitrostarch.

WALTER DURGIN BOWLBY.